United States Patent [19]

Shiga et al.

[11] 4,285,779

[45] Aug. 25, 1981

[54] METHOD OF MAKING A FLUID CIRCUIT DEVICE

[75] Inventors: Tatsuhide Shiga, Zushi; Yoshihiro Tsuruoka; Motoo Suzuki, both of Yokohama, all of Japan

[73] Assignee: Honeywell Inc., Minneapolis, Minn.

[21] Appl. No.: 37,421

[22] Filed: May 9, 1979

[30] Foreign Application Priority Data

May 24, 1978 [JP] Japan ................................. 53/60917

[51] Int. Cl.³ ........................... C25D 1/02; C25D 5/02
[52] U.S. Cl. ............................................ 204/9; 204/16
[58] Field of Search ............................. 204/3, 4, 9, 16

[56] References Cited

U.S. PATENT DOCUMENTS

| 1,646,602 | 10/1927 | Smith | 204/3 |
|---|---|---|---|
| 3,022,230 | 2/1962 | Fialkoff | 204/9 |
| 3,595,025 | 7/1971 | Stockel | 204/9 |
| 4,028,198 | 6/1977 | Tuscher | 204/9 |

*Primary Examiner*—T. M. Tufariello
*Attorney, Agent, or Firm*—Laurence J. Marhoefer; Lockwood D. Burton; Mitchell J. Halista

[57] ABSTRACT

A fluid circuit device provided with a fluid circuit formed by a base member and a thin sheet integrally electrocast on said base member and methods for producing the fluid circuit device with parallel and non-parallel fluid circuits.

5 Claims, 14 Drawing Figures

METHOD OF MAKING A FLUID CIRCUIT DEVICE

BACKGROUND OF THE INVENTION

1. Field of the Invention

The present invention relates to fluid circuit devices. More specifically the present invention is directed to fluid conduits for transmitting fluid signals among various elements and methods for making such fluid conduits.

2. Description of the Prior Art

In the recent years, it has been required that various fluid devices such as a gas control device, hydraulic machineries and devices such as a hydraulic actuator, and pneumatic instruments are to be particularly reliable and durable. Under the circumstances, various types of fluid circuit boards have been developed as means to transmit fluid signals among elements in this type of fluid devices. However, those prior art devices have serious limitations either in the size and spacing of the fluid circuits or in the manufacturing operations which prevent the production of fluid circuit devices of optimum weight and cost.

SUMMARY OF THE INVENTION

An object of the present invention is to provide an improved fluid circuit devices capable of provided a plurality of closely spaced fluid circuits.

Another object of the present invention is to provide an improved fluid circuit device capable of providing separate fluid circuits which cross each other.

A further object of the present invention is to provide an improved fluid circuit device having a simple manufacturing technique capable of minimizing manufacturing cost and time.

In accomplishing these and other objects, there has been provided, in accordance with the present invention, a fluid circuit device having a base plate and a sheet integrally electrocast on the base plate while providing fluid circuits between the base plate and the sheet. The method of making this fluid circuit device includes moulding the fluid circuits on the base plate by a selectively removable material, electrocasting the sheet on the material and removing the material from between the sheet and the base plate.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Detailed Description

Figure 1:
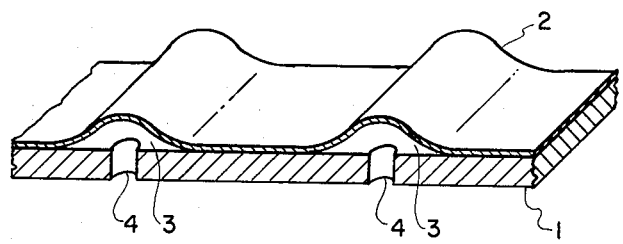
FIGS. 1, 2 and 3(a) and 3(b) show perspective views of conventional fluid circuit boards.

FIG. 1 is a perspective view showing one example of a conventional type fluid circuit board wherein a reference numeral 1 denotes the base plate. A metal plate 2 having grooves formed by press forming is integrally adhered by a thermo-compression process to the base 1 via an adhesive agent. The grooves of the metal plate 2 and the adjacent surface of the base plate 1 form a fluid, or conduit, circuit 3, and fluid guide holes 4 are provided through the said base plate 1 into the fluid circuits 3. On the other surface of the base plate 1 opposite the metal plate 2 there can be provided various elements (not shown) using fluid signals carried by the fluid circuits 3 of this device. The fluid signals are transmitted among those various elements via the guide holes 4 from the fluid circuits 3.

In the conventional fluid circuit board as above constructed, the grooves in the plate 2 are limited shape-wise because they are formed by a metal forming press. In other words, if the metal plate 2 is bent at a sharp angle to form more upright groove walls, the bending may cause cracks in the metal plate 2, unless a bigger bending radius is used. Thus, it becomes necessary to provide a greater distance between neighboring grooves which is contrary to the desirable purpose of making the device compact and small. Further, in adhering the metal plate 2 and the base 1 to each other, to produce a fluid tight seal is necessary to give their contacting surfaces as smooth a surface finish as possible, which requires extra work in removing strains caused by the press work, handling, etc.

Figure 2:
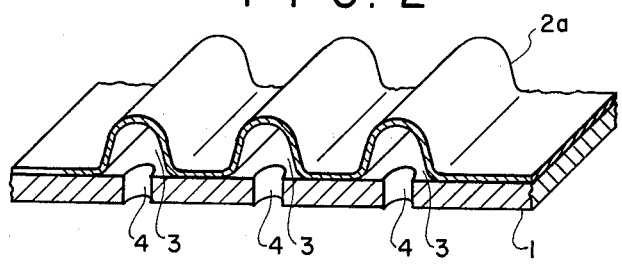

FIG. 2 is a perspective view showing another conventional type fluid circuit board. In this structure, the metal plate 2a is manufactured by the electrocasting method. This method allows the standing-up angle of the groove wall to be sharp and, compared to the device shown in FIG. 1 to decrease greatly the distance between neighboring grooves when providing a plurality of them. It is also advantageous in that no strain is caused by the press work. However, since those conventional type devices shown in FIGS. 1 and 2 adhere the base 1 and the metal plates 2, 2a integrally together using an adhesive agent, it is necessary to take sufficient care about the quality of the adhesive agent used, the conditions of thermo-compression process, etc. as well as to keep the adjacent adhesive coated surfaces smooth.

Figure 3A:
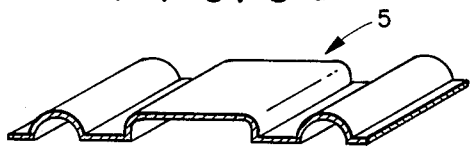
Figure 3B:
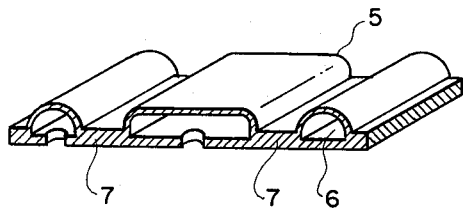

Another prior art structure shown in FIGS. 3(a) and 3(b) was, then, proposed. FIG. 3(a) is a perspective view wherein is shown only the portion of grooves, and FIG. 3(b) shows the completed circuit board. The groove portion 5 shown in FIG. 3(a) is formed by electrocasting and has a plurality of grooves. The groove portion 5 is further electrocast to cover the opening of the groove to form a fluid circuit 6 and a base plate 7. As a result, an integrally formed circuit board having a fluid circuit 6 shown in FIG. 3(b) is obtained. However, that circuit board forms the whole wall surface for the fluid circuit 6 by a type of casting method called electrocasting which uses electrolysis of a metallic salt solution. Not only is a considerable length of time required to achieve a desired thickness of the wall; but the mechanical strength of the completed circuit board is insufficient to support various elements of the fluid device thereon, which comprise integrally the whole of the device.

The present invention is effective to overcome the aforesaid limitations of the prior art. According to the present invention, there is provided a fluid circuit device which comprises a base plate and a thin sheet portion formed by electrocasting on said base plate. The device is mechanically strengthened to a great extent so that it allows various elements to be installed thereon, whereby the entire fluid device is integrally constructed with a lighter weight, a lower cost and a shorter time for manufacturing.

Figure 4:
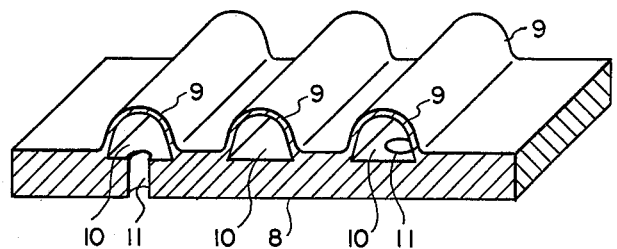
FIG. 4 is a perspective view showing an example of one embodiment of this invention.

The invention is now described more in detail by referring to accompanying drawings. FIG. 4 is a perspective view showing one embodiment of the present invention wherein a reference numeral 8 denotes a base plate which may be a portion of a thicker plate or a block, and which may be a plastic plate instead of metal. A reference numeral 9 denotes a thin sheet directly applied to the surface of the base plate 8 by electrocasting, and a plurality of fluid circuits 10 are formed between the thin sheet 9 and the surface of the base plate 8. There are provided holes 11 in the base plate 8 to connect the fluid circuit 10 to the surface of the base plate 8. On this surface of the base plate 8 opposite the thin sheet 9 are loaded various elements (not shown) for constituting the fluid device. These elements are connected to each other via the holes 11 and the fluid circuit 10.

The steps of manufacturing this circuit device is now explained referring to FIG. 5, which is an exploded perspective view showing the sequential manufacturing steps. As shown in FIG. 5(a), a mould 13 having grooves 12 corresponding in size to the inner diameter of the fluid circuit 10 and shaped and arranged in a predetermined manner is placed over the surface of the base plate 8 on which the holes 11 have been bored in advance. The mould 13 and the plate 8 are held together under pressure. When the base plate 8 is formed of a non-conductive material, it is necessary that the plate 8 be made conductive by plating it with conductive material.

Figure 5A:
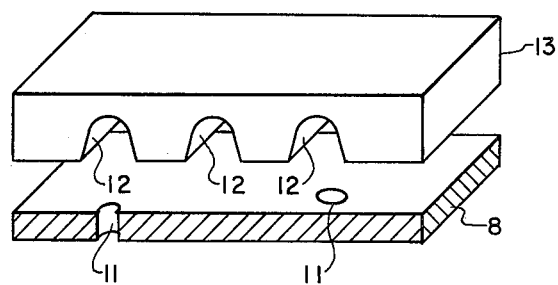
FIGS. 5(a), 5(b) 5(c) and 5(d) show sequential steps in a method for making the fluid conduit of the present invention.
Figure 5B:
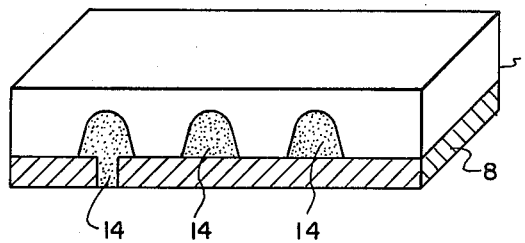

While the mould 13 is placed under pressure upon the surface of the base plate 8, soluble substance 14 is poured through the guide holes 11 as shown in FIG. 5(b) and then it is allowed to be solidified. This substance 14 is soluble by heating or by chemicals. It may be, for instance, a low temperature fusing alloy of bismuth group or iridium group in case of a metallic substance, or a wax in case of the non-metallic. When it is difficult to separate the soluble substance 14 from the base plate 8 or the mould 13, it is necessary to coat a demoulding agent in advance on the portions with which the soluble substance 14 comes into contact.

Figure 5C:
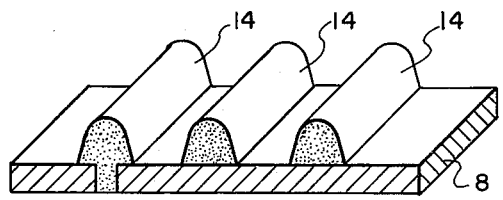
Figure 5D:
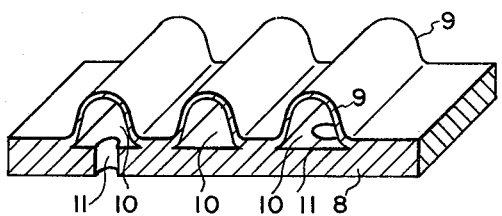

A shown in FIG. 5(c), the mould 13 is removed. In this embodiment, the mould 13 is used to obtain the resultant as shown in FIG. 5(c). However, it is possible to place the soluble substance 14 by ejection from a nozzle, etc. continuously and directly on the base plate 8. The surface of the soluble substance 14 and the base plate 8 are coated with conductive paint in advance. When both the base plate 8 and the soluble substance 14 are conductive, however, the conductive paint need not be applied. This combination is then immersed in a solution of metallic salts (not shown) for electrolysis to form the then sheet 9. Finally, the soluble substance 14 is removed through the guide holes 11 by heating or with suitable chemicals. Following the above steps, the fluid circuit device of the present invention shown in FIG. 5(d) is obtained.

Figure 6:
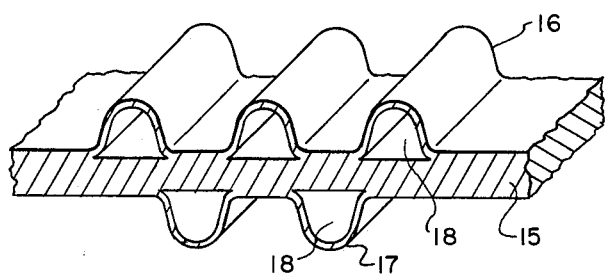
FIGS. 6, and 7(a) and 7(b) are perspective views showing examples of other embodiments of the present invention.

FIGS. 6, 7 and 8 show other embodiments of the present invention. In the embodiment of FIG. 6, there are formed thin sheet portions 16, 17 on both surfaces of the base plate 15. In this case, however, on at least one surface of the base plate 15, various related elements (not shown) are provided in such a way that they would not interfere with the convex ridge of said thin sheet portions 16, 17 on the fluid circuit 18.

Figure 7A:
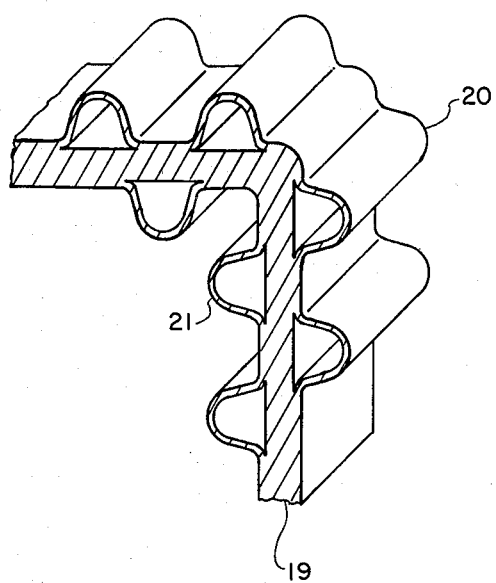
Figure 7B:
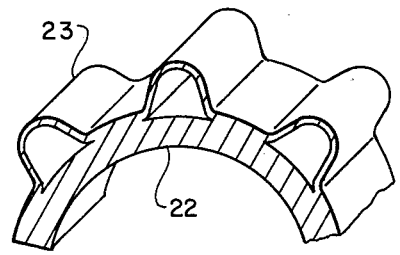

In FIGS. 7(a) and 7(b) there are shown embodiments using a bent base plate. In FIG. 7(a), on the two surfaces of a base plate 19 which is bent substantially at a right angle there are formed the the thin sheets 20, 21. In FIG. 7(b), there is shown a thin sheet 23 formed on one surface of a curved base plate 22. With this structure, it becomes possible to provide this fluid circuit device on a part of a case for a fluid device, or on the side of a block containing various related elements.

Figure 8A:
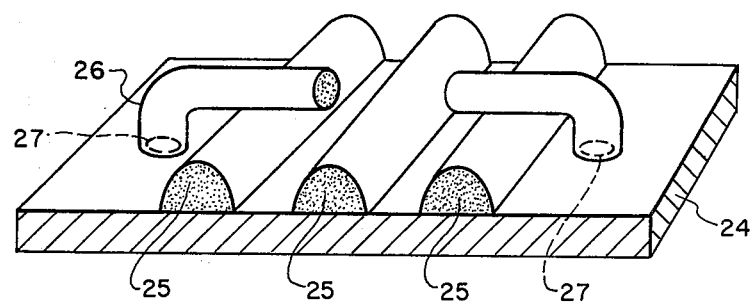
FIGS. 8(a) and 8(b) show still another example of an embodiment of the present invention and a method for making this embodiment.
Figure 8B:
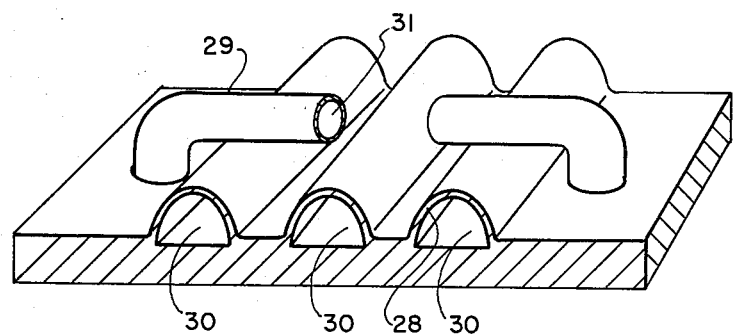

FIG. 8(a) shows an embodiment where the fluid circuits are not parallel, i.e., where the fluid circuits cross each other without forming any mutual fluid short-circuits. On the surface of a base plate 24 are formed a plurality of ridges substantially parallel to each other which are made of a soluble substance 25 and another ridge of a free-standing soluble substance 26 crossing over and separated from the parallel ridges 25. Both ends of the latter soluble substance 26 are connected to respective ones of fluid guide holes 27 bored through the base plate 24. Thereafter, the base plate 24 is electrolyzed in a metallic salt solution to form thin coatings 28, 29. Finally, a fluid circuit device shown in FIG. 8(b) is obtained after removing the soluble substances 25, 26 to obtain fluid circuits 30 and 31. According to this embodiment, it becomes possible to produce fluid circuits without detouring the other when they cross each other. This will shorten the fluid circuits 30, 31 and result in a compact device.

As explained above, the present invention provides a fluid circuit comprising a base plate and a thin sheet integrally electrocast on the said base plate, thereby increasing the mechanical strength of the base plate. This strengthened base plate can support various circuit elements thereon, thus making the construction of the hydraulic device compact and integral. Since it is also possible to use lightweight materials for the base plate, the weight of the completed product is totally decreased. In addition, electrocasting is required only for the surface of the base plate, thereby decreasing the cost and the time required for manufacture. Finally, the fluid circuites can be parallel and non-parallel without a fluid short-circuit.

Accordingly, it may be seen that there has been provided, in accordance with the present invention, an improved fluid circuit device for providing parallel and non-parallel fluid circuits.

The embodiments of the invention in which an exclusive property or privilege may is claimed are defined as follows:

1. A method for making a fluid circuit device including the steps of preparing a base plate with holes in predetermined locations, preparing a mould in which grooves are formed corresponding in size, shape and pattern of the fluid circuit, placing the mould on the surface of the base plate in a predetermined position with the holes in the base plate being aligned with respective ones of the grooves in the mould, filling the grooves in the mould with a soluble substance through the holes in the base plate, allowing the soluble substance to soldify, removing the mould from the base plate while leaving the soluble substance on the base plate, depositing a metallic plating on the surface of the solidified soluble substance and the base plate and removing the soluble substance from the base plate through the holes in the base plate.

2. A method as set forth in claim 1 wherein said metallic plating is deposited by electrocasting.

3. A method as set forth in claim 1 and including the further step of depositing an electrically conductive layer on the surface of the solidified soluble substance and base plate after removal of the mould for electrical non-conductive materials used for the soluble substance and the base plate.

4. A method as set forth in claim 1 wherein said solidified substance is removed by melting.

5. A method for making a fluid circuit device as set forth in claim 1 and including further steps of providing at least two holes in the base plate which holes are not aligned with grooves in the mould an positioning a soluble substance in the form of a free-standing element bridging and covering said last-mentioned holes after the mould is removed from said base plate whereby said metallic plating is also applied to the free-standing element and removing the free-standing element concurrently with the soluble substance formed by the mould.

* * * * *